United States Patent [19]

Senoo et al.

[11] Patent Number: 5,105,361
[45] Date of Patent: Apr. 14, 1992

[54] STRUCTURE OF SYSTEM FOR AUTOMATICALLY CONTROLLING VEHICLE SPEED TO DESIRED CRUISE SPEED

[75] Inventors: Tetsuo Senoo, Tokyo; Isao Yamamoto; Toshiaki Hara, both of Kanagawa, all of Japan

[73] Assignee: Nissan Motor Company, Ltd., Japan

[21] Appl. No.: 571,351

[22] Filed: Aug. 23, 1990

[30] Foreign Application Priority Data

Aug. 31, 1989 [JP] Japan .................................. 1-223022

[51] Int. Cl.$^5$ .............................................. B60K 31/00
[52] U.S. Cl. .............................. 364/426.04; 364/431.07
[58] Field of Search .................. 364/426.04, 431.07, 364/424.05; 180/175, 176, 178, 179, 177; 123/352, 360, 361; 307/9.1, 10.1

[56] References Cited

U.S. PATENT DOCUMENTS

| | | | |
|---|---|---|---|
| 4,451,888 | 5/1984 | Kuno et al. | 364/426.04 |
| 4,540,060 | 9/1985 | Kawata et al. | 364/426.04 |
| 4,829,438 | 5/1989 | Etoh | 364/426.04 |
| 4,879,655 | 11/1989 | Mori | 364/426.04 |
| 4,914,595 | 4/1990 | Suzuki et al. | 364/426.04 |
| 4,914,596 | 4/1990 | Etoh et al. | 364/426.04 |

FOREIGN PATENT DOCUMENTS

| | | |
|---|---|---|
| 0115962 | 8/1984 | European Pat. Off. . |
| 0314168 | 5/1989 | European Pat. Off. . |
| 58-81838 | 5/1983 | Japan . |
| 2193589 | 2/1988 | United Kingdom . |

*Primary Examiner*—Parshotam S. Lall
*Assistant Examiner*—Michael Zanelli
*Attorney, Agent, or Firm*—Loew, Price, LeBlanc & Becker

[57] ABSTRACT

A structure of a system for automatically controlling a vehicle speed to a desired cruise speed is disclosed in which, when a signal generated by a cancel switch provided for halting a control operation of the system, is generated by a turning on of the cancel switch, a voltage applying portion, intervened between the cancel switch and each signal lines connected between one of set/coast switch and acceleration/resume switch and a corresponding input end of a control circuit, generates a voltage whose level is different from that generated when either set/coast or acceleration/resume switch is operated, the voltage being supplied to each of the signal lines. A signal generating portion provides a third signal in response to the applied voltage from the voltage applying portion to another input end of the control circuit. Thus, the cancel switch signal can be distinguished and identified from the other switch signals derived from the set/coast and acceleration/resume switches even if one or all of the signal lines has failed.

10 Claims, 3 Drawing Sheets

STRUCTURE OF SYSTEM FOR AUTOMATICALLY CONTROLLING VEHICLE SPEED TO DESIRED CRUISE SPEED

BACKGROUND OF THE INVENTION (1) Field of the invention

The present invention relates generally to a structure of a system for automatically controlling a vehicle speed to a desired cruise speed.

(2) Background of the art

Various types of systems for automatically controlling a vehicle speed to a desired cruise speed without depression of an accelerator pedal by a vehicle driver have been proposed.

In one of the above-described previously proposed systems for automatically controlling the vehicle speed to the desired cruise speed, when a vehicle driver operates an accelerator pedal to accelerate the vehicle and the vehicle speed reaches a speed at which the vehicle driver desires to cruise, the vehicle driver pushes a set/coast switch. At this time, the vehicle speed when the set switch is pushed is stored in a control circuit as a set cruise speed. Thereafter, the system automatically controls an opening angle of a throttle valve installed in a vehicular engine or of a carburetor in response to a command derived from the control circuit. When the driver desires the set speed to increase, an acceleration/resume switch is continually activated (turned on) and the control circuit issues a command to increase the opening angle of the throttle valve so that the vehicle speed is increased. When the acceleration switch is released, the instantaneous vehicle speed is set as a new set vehicle speed. When the driver desires to decrease the vehicle speed, the set/coast switch is continued to be turned on so that an engine braking occurs and vehicle speed is decreased. Thereafter, when the set/coast switch is released, the instantaneous vehicle speed is set as a new set cruise speed. When a cancel switch is operated, the cruise speed control is interrupted (refer to Japanese Patent Application First Publication (unexamined) No. Showa 58-81838 published on May 17, 1983.)

An input circuit of the previously proposed system for automatically controlling the vehicle speed to a desired cruise speed will be described below.

The set/coast switch and acceleration/resume switch are connected to an input control circuit via signal lines, respectively.

The input control circuit constitutes a part of the control circuit. Each signal line is connected with a resistor and a zener diode for protecting the input control circuit from an overload voltage.

The cancel switch is connected to each signal line via a diode. The input control circuit, i.e., control circuit is constituted by a microcomputer or logic IC.

When either the set/coast switch or acceleration/-resume switch is operated (turned on), a signal voltage, divided by resistance values of the resistors, is applied to a first input terminal of the input control circuit.

The input control circuit receives the signal voltage and identifies the signal indicating a command to set the vehicle speed, a command to decrease the set vehicle speed, or a command to increase the vehicle speed. The control circuit then executes a predetermined control operation according to the command.

If the cancel switch is operated, the signal voltage is applied via both signal lines to both of the first and a second input terminals. The control circuit determines that the signal voltage applied thereto is a signal indicating a command to cancel the control operation and interrupts the control operation of the vehicle speed.

However, since both signal lines are used to transmit the three switch signals to the input control circuit in the previously proposed system for automatically controlling the vehicle speed to the desired cruise speed, one signal line is used to transmit the two levels of signal voltage; low (L) level when one of the operation switches is turned off and; high (H) level when one of the operation switches is turned on, so that the operation of either of the set/coast or acceleration/resume switch is identified.

If both of the signal lines transmit high levels of the signal voltages, the control circuit determines that the cancel switch has been operated.

The H level generated when the cancel switch is operated and that generated when either of the set/-coast or acceleration/resume switches are operated have no significant difference in level from each other. Therefore, if one of the signal lines should be broken or one of the zener diodes connected between the respective signal lines and ground fails, proper identification of switch operations cannot be made.

SUMMARY OF THE INVENTION

It is therefore an object of the present invention to provide a structure of system for automatically controlling a vehicle speed to a desired cruise speed in which a predetermined voltage difference occurs between the signal voltage generated when a cancel switch is operated and that generated when either a set/coast or an acceleration/resume switch is operated, the predetermined difference of voltage causing a new cancel signal to be generated and input to an input control circuit.

The above-described object can be achieved by providing an input structure of a system, comprising: a) at least two first switches, each having one end connected to a bias voltage supply line; b) a plurality of signal lines, each connected between the other end of each first switch and a first input end of a control circuit and each having first means for defining a high-level signal input from the corresponding first switch when the corresponding first switch is turned on and a low-level signal input from the corresponding first switch when the corresponding first switch is turned off; c) a second switch having one end connected to the bias voltage supply line; d) second means, intervened between the other end of the second switch and each of the signal lines, for providing another high level signal which is lower than the high level signal defined by the first means by a predetermined value when the second switch is turned on; and e) third means, intervened between each signal line and a second input end of the control circuit, for providing the high level signal having a level value substantially equal to that defined by the first means for the second input end when receiving the other high level signal from the second means.

The above-described object can also be achieved by providing an input structure of a system for automatically controlling a vehicle speed to a desired cruise speed, comprising: a) set/coast and acceleration/-resume switches, each switch thereof having one end connected to a bias voltage supply line; b) two signal lines, a first signal line connected between another end of the set/coast switch and a first input end of a control circuit, a second signal line connected between another end of the acceleration/resume switch and a second input end of the control circuit, each signal line having first means for defining a high level signal input from the corresponding one of the set/coast and acceleration/resume switches when the corresponding one of the set/coast and acceleration/resume switches is turned on and a low level signal input from the corresponding one of the set/coast and acceleration/resume switches when the corresponding one of the switches is turned off; c) a cancel switch having one end connected to the bias voltage supply line; d) second means, intervened between another end of the cancel switch and each of the signal lines, for providing another high level signal which is lower than the high level signal defined by the first means by a predetermined value when the cancel switch is turned on; and e) third means, intervened between each signal line and a third input end of the control circuit, for providing the high level signal having a level value substantially equal to that defined by the first means for the third input end when receiving the other high level signal from the second means.

DETAILED DESCRIPTION OF THE PREFERRED EMBODIMENTS

Reference will hereinafter be made to the drawings in order to facilitate a better understanding of the present invention.

Figure 1:
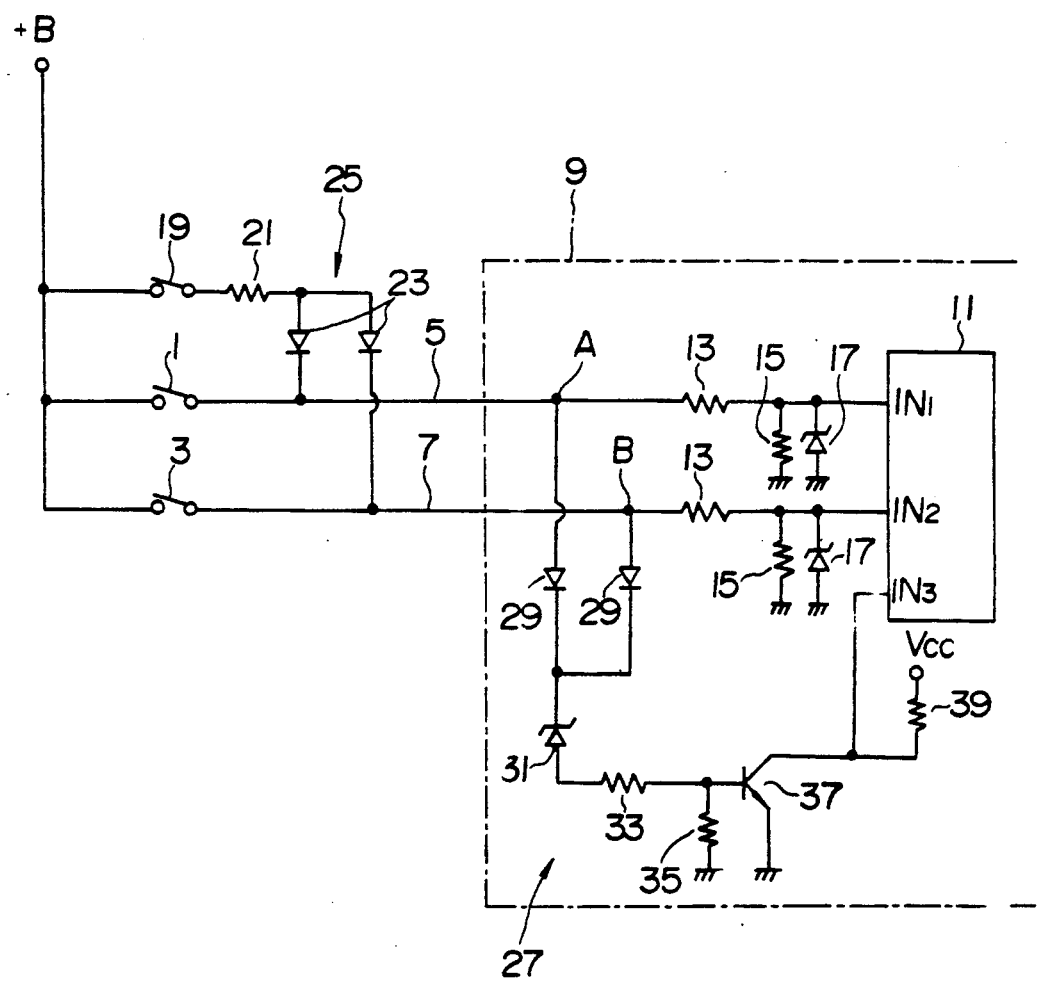
FIG. 1 is a circuit wiring diagram of a system for automatically controlling a vehicle speed to a desired cruise speed in a first preferred embodiment according to the present invention.

FIG. 1 shows a first preferred embodiment of a system for automatically controlling a vehicle speed to a desired cruise speed. It is noted that an output portion of a control circuit is omitted here.

A structure of the system for automatically controlling a vehicle speed to a desired cruise speed other than that shown in FIG. 1 is exemplified by U.S. Pat. No. 4,914,595 issued on April 3, 1990 and U.S. Pat. No. 4,829,438 issued on May 9, 1989, the disclosures of which are hereby incorporated by reference.

A set/coast switch 1 which serves to output a signal indicating a command to set an instantaneous vehicle speed to a set cruise speed or a command to decrease the set cruise speed and an acceleration/resume switch 3 which serves to output a signal indicating a command to accelerate the vehicle from the set cruise speed are connected to input terminals $IN_1$ and $IN_2$, respectively, via signal lines 5 and 7. The input terminals of an input control circuit 11 which constitutes a control circuit 9 for a vehicle speed controlling system have resistors 15, 15 and zener diodes 17, 17.

A signal voltage generated when either of the set/coast switch 1 or acceleration/resume switch 3 is operated indicates an H level, the H level being determined according to a divided voltage of corresponding resistor 13 and the clamped voltage across the corresponding zener diode 17.

A cancel switch 19 operated to cancel the cruise control operation is connected to each signal line 5 and 7 via a resistor 21 and each diode 23, 23.

A cancel switch signal generated when the cancel switch 19 is operated indicates a new H level, the new H level thereof being lower than the H level described above by a voltage drop of the resistor 21 and each of the corresponding diode 23.

A new input terminal $IN_3$ is provided in the input control circuit 11 for identifying the cancel switch signal. A signal generating portion 27 is intervened between the signal lines 5 and 7 and input terminal $IN_3$ for generating a third signal in response to the H level signal derived from the cancel switch 19 and transmitting the third signal to the input terminal $IN_3$.

The signal generating portion 27 includes diodes 29, 29 connected respectively to both signal lines 5 and 7 and a transistor 37 whose base is connected to the diodes 29, 29 via a zener diode 31 and voltage dividing resistors 33 and 35. A collector of the transistor 37 is connected to the input terminal $IN_3$ of the input control circuit 11. An emitter thereof is grounded. The input terminal $IN_3$ is connected to a reference voltage supply $V_{cc}$ via a resistor 39.

The input control circuit 11 (and control circuit 9) is constituted by a microcomputer or logic IC.

When a signal voltage is received at the first input terminal $IN_1$, the instantaneous vehicle speed is stored as a set cruise speed into the control circuit 9 and the control circuit 9 is operated to control an opening angle of a throttle valve so that the vehicle speed reaches the set cruise speed whose value is stored therein. When, during the cruise speed control the signal voltage is continously received, the vehicle speed is reduced due to engine braking. Thereafter, the instantaneous vehicle speed is newly stored into the control circuit 9 as the set cruise speed when the operation of the set/coast switch 1 is released.

When the signal voltage is continuously received at the input terminal $IN_2$, an engine throttle valve is continously opened to increase the vehicle speed. When the input of the signal voltage is halted, the instantaneous vehicle speed is stored as the set cruise speed and thereafter an actual vehicle speed is controlled to reach the set cruise speed.

An operation of the first preferred embodiment will be described below.

When either the set/coast switch 1 or acceleration/resume switch 3 is operated, the signal voltage of the H level divided by means of the two resistors 13 and 15 is clamped by means of the zener diode 17 and transmitted to either of the input terminals $IN_1$ or $IN_2$.

At the same time, when either one of the diodes 29 in the signal generating means 27 conducts and the zener diode 31 conducts, the transistor 7 is turned on due to the voltage divided by the resistors 33 and 35 so that the input terminal $IN_3$ is at the low (L) level.

When the set/coast switch 1 is operated, the input terminal $IN_1$ is only at the high (H) level and both of the input terminals $IN_2$ and $IN_3$ are at low (L) levels. When the acceleration/resume switch 3 is operated, only the input terminal $IN_2$ is at the high (H) level and both of the input terminals $IN_1$ and $IN_3$ are at the low (L) levels.

Thus, the input control circuit 11 can identify either of which of the switches 1 and 3 is operated.

Next, when the cancel switch 19 is operated, a potential at a point A or at a point B of each signal line 5 or 7 indicates a lower voltage than the cases when either the set/coast switch 1 or acceleration/resume switch 3 is turned on.

Since the resistance values of the resistors 21, 13, 15, 33, and 35 and operating characteristic of the zener diode are selected such that when the potentials of the points A and B indicate low values, the transistor 37 is turned off. Therefore, when the cancel switch 19 is turned on, both input terminals $IN_1$ and $IN_2$ indicate high (H) levels and input terminal $IN_3$ indicates the H level. Thus, the input control circuit 9 can identifiy that the cancel switch 19 is turned on.

If one of the signal lines 5 and 7 should be broken and under this condition, the cancel switch 19 is turned on, the input terminal $IN_1$ or $IN_2$ connected to the broken signal line is at the L level but the input terminal $IN_1$ or $IN_2$ connected to the normal signal line (not broken) is at the H level. Then, since the transistor 37 in the signal generating portion 27 is turned off, the input terminal $IN_3$ is at the H level.

In this way, since the combinations of the signal voltages different from the normal state when any one of the set/coast switch 1, acceleration/resume switch 3, or cancel switch 19 are given, the input control circuit 11 can identify that the system has failed.

Since the same combinations of signal voltages as the case of the broken signal line 5 or 7 appear on the input terminals $IN_1$, $IN_2$ and $IN_3$ in a case where any one of the diodes 23, 23 has failed, the input control circuit 11 can identify that the system has failed.

The signal levels at the input terminals $IN_1$, $IN_2$, and $IN_3$ of the input control circuit 11 provide an identifying means of the failures of the broken signal line and diode failure. The advantage that the three switch signals can be transmitted on two signal lines can be assured with the simple structure of input wiring.

It is noted that warning of system failure can be provided with addition of a buzzer circuit.

Figure 2:
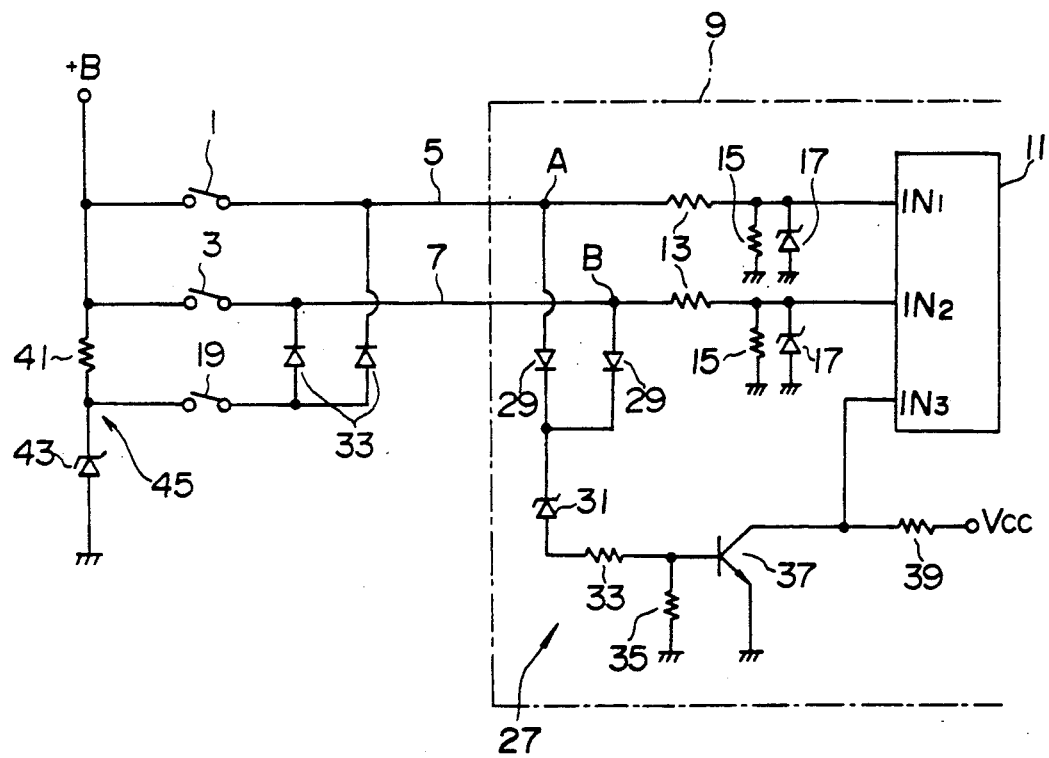
FIG. 2 is a circuit wiring diagram of a system for automatically controlling a vehicle speed to a desired cruise speed in a second preferred embodiment according to the present invention.

FIG. 2 shows a second preferred embodiment of the system for automatically controlling the vehicle speed to the desired cruise speed.

In the second preferred embodiment, the voltage applying portion denoted by 45 is constituted by a resistor 41 and a zener diode 43, the zener diode 43 clamping the voltage of the cancel switch signal. The signal generating portion 27 is the same as that in the first preferred embodiment.

A basic operation of the second preferred embodiment is the same as the first preferred embodiment.

In the second preferred embodiment, since a constant cancel switch signal voltage is always generated due to a clamp action of the zener diode 43 even if a variation of a bias voltage +B occurs, the operation of the control circuit 9 is not susceptible to bias supply voltage variation.

Figure 3:
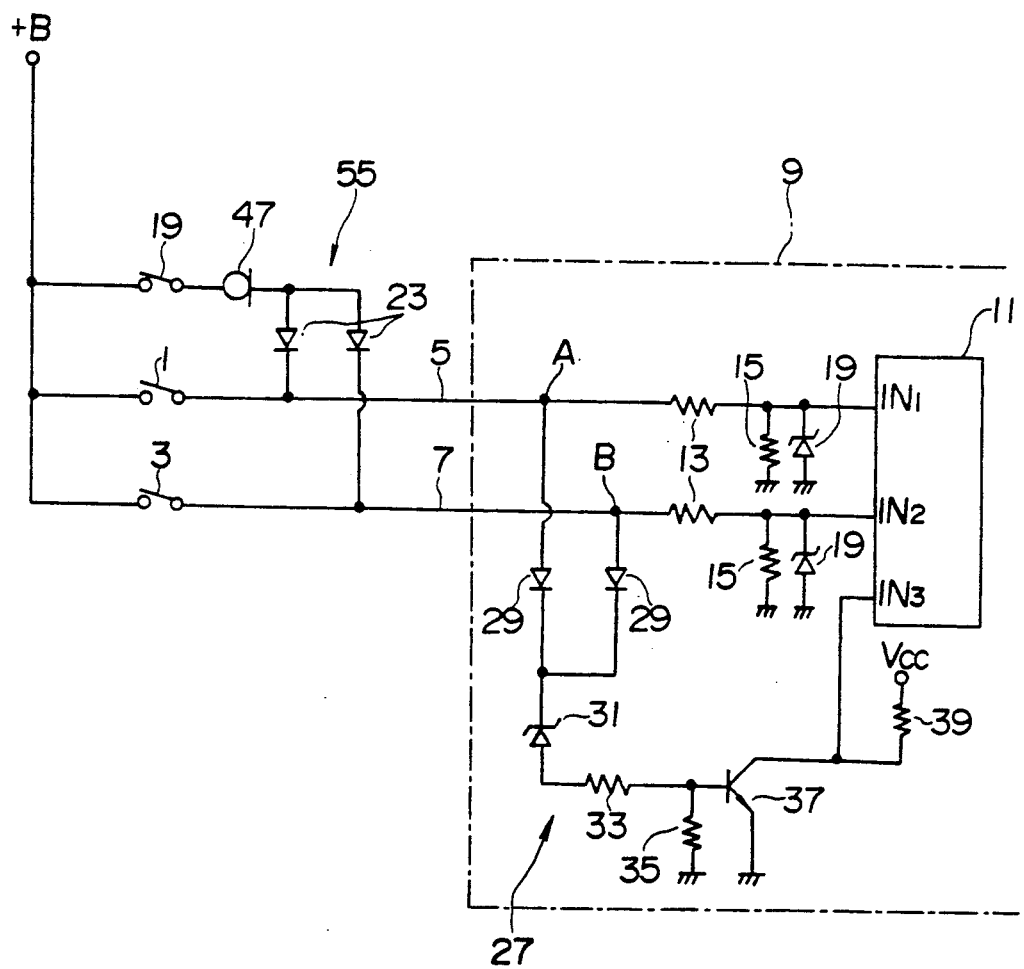
FIG. 3 is a circuit wiring diagram of a system for automatically controlling a vehicle speed to a desired cruise speed in a third preferred embodiment according to the present invention.

FIG. 3 shows a third preferred embodiment of the system for automatically controlling vehicle speed to a desired cruise speed.

In FIG. 3, the voltage applying portion 55 is constituted by a constant current diode in place of the resistor 21 in the first preferred embodiment. The basic operation is the same as in the first preferred embodiment.

Since a constant current of the cancel switch signal always flows into the signal lines 5 and 7 due to the presence of the constant current diode 47 even if the variation in the bias supply voltage +B occurs, the potentials at the A and B points indicate constant values when the cancel switch 19 is turned on. Therefore, the signal current at the input terminals is not susceptible to the variation of the bias supply voltage in the same way as in the second preferred embodiment.

Since as described hereinabove, in the system and method for automatically controlling the vehicle speed to the desired cruise speed, the cancel switch signal is applied to the two signal lines as a voltage value different by the predetermined value from the other operation switch signals (set/coast switch and acceleration/resume switch), the system can identify failure due to a broken signal line or of a circuit component constituting the input circuit according to a difference thereof from the cancel switch signal.

Additon of a voltage applying portion or signal generating portion to the input circuit can achieve an advantage in that three switch signals can be transmitted on two signal lines and achieve superior automatic vehicle speed control.

It will fully be appreciated by those skilled in the art that the foregoing description has been made in terms of the preferred embodiments and various changes and modifications can be made without departing from the scope of the present invention which is to be defined by the appended claims.

What is claimed is:

1. An input system structure, comprising:
   a) at least two first switches, each having one end connected to a bias voltage supply line;
   b) a plurality of signal lines, each connected between the other end of each first switch and a first input end of a control circuit and each having first means for defining a high-level signal input from the corresponding first switch when the corresponding first switch is turned on and a low-level signal input from the corresponding first switch when the corresponding first switch is turned off;
   c) a second switch having one end connected to the bias voltage supply line;
   d) second means, intervened between the other end of the second switch and each of the signal lines, for providing another high level signal which is lower than the high level signal defined by the first means by a predetermined value when the second switch is turned on; and
   e) third means, intervened between each signal line and a second input end of the control circuit, for providing the high level signal having a level value substantially equal to that defined by the first means for the second input end when receiving the other high level signal from the second means.

2. An input structure as set forth in claim 1, wherein the second means comprises a first resistor connected to the other end of the second switch and a plurality of first diodes each connected between the first resistor and the corresponding signal line.

3. An input structure as set forth in claim 1, wherein the first means comprises a second resistor connected between the other end of each first switch and each first input end of the control circuit, a third resistor connected between each first input end and ground, and a first zener diode connected between each first input end and ground.

4. An input structure as set forth in claim 2, wherein the third means comprises a plurality of second diodes, each connected to the corresponding signal line, a second zener diode connected to each second diode, a fourth resistor connected to the second zener diode, a fifth resistor connected between the fourth resistor and ground, a transistor whose base is connected to the fifth resistor, the emitter of which is grounded, and whose collector is connected to the second input end, and a pull-up resistor connected between the collector of the transistor and a bias voltage supply for the collector.

5. An input structure as set forth in claim 4, wherein the values of the first, fourth, and fifth resistors and the resistance values of the first and second diodes and the second zener diode are so selected that when the second switch is turned on, the transistor is turned off.

6. An input structure as set forth in claim 1, wherein the second means comprises a constant current diode connected to the other end of the second switch and a plurality of first diodes each connected to the corresponding signal line.

7. An input structure as set forth in claim 1, wherein the second means comprises a resistor connected between the one end of the bias supply line and the one end of the second switch and a zener diode connected between the one end of the second switch and ground.

8. An input structure of a system for automatically controlling a vehicle speed to a desired cruise speed, comprising:
 a) set/coast and acceleration/resume switches, each switch thereof having one end connected to a bias voltage supply line;
 b) two signal lines, a first signal line connected between another end of the set/coast switch and a first input end of a control circuit, a second signal line connected between another end of the acceleration/resume switch and a second input end of the control circuit, each signal line having first means for defining a high level signal input from the corresponding one of the set/coast and acceleration/resume switches when the corresponding one of the set/coast and acceleration/resume switches is turned on and a low level signal input from the corresponding one of the set/coast and acceleration/resume switches when the corresponding one of the switches is turned off;
 c) a cancel switch having one end connected to the bias voltage supply line;
 d) second means, intervened between another end of the cancel switch and each of the signal lines, for providing another high level signal which is lower than the high level signal defined by the first means by a predetermined value when the cancel switch is turned on; and
 e) third means, intervened between each signal line and a third input end of the control circuit, for providing the high level signal having a level value substantially equal to that defined by the first means for the third input end when receiving the other high level signal from the second means.

9. An input structure as set forth in claim 8, wherein the control circuit determines that the set/coast switch is turned on when receiving the high level signal only from the first signal line and sets an instantaneous vehicle speed as the desired cruise speed so that the control circuit controls the vehicle speed to reach the set vehicle speed and controls the vehicle speed to decrease from the set vehicle speed when receiving the high level signal from the first input end over a predetermined time, the control circuit further determines that the acceleration/resume switch is turned on when receiving the high level signal only from the second input end, the control circuit then controls the vehicle speed to increase the vehicle speed until receiving the low level signal from the second input end and, when receiving the low level signal the control circuit, controls the vehicle speed to reach the set vehicle speed which is set when receiving the low level signal at the second input end and, the control circuit halting the control operation when receiving the high level signals from the first, second, and third input ends upon determination that the cancel switch is turned on.

10. An input structure as set forth in claim 9, wherein the control circuit determines that the system has failed when receiving the high level signal from the third input end only.

* * * * *